(12) United States Patent
Carlson et al.

(10) Patent No.: US 11,155,048 B2
(45) Date of Patent: Oct. 26, 2021

(54) MATERIAL DISPENSING SYSTEMS

(71) Applicant: Bell Helicopter Textron Inc., Fort Worth, TX (US)

(72) Inventors: David G. Carlson, North Richland Hills, TX (US); Paul K. Oldroyd, Azle, TX (US); George R. Decker, Mansfield, TX (US); Doug K. Wolfe, Denton, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 5 days.

(21) Appl. No.: 16/031,452

(22) Filed: Jul. 10, 2018

(65) Prior Publication Data

US 2020/0016847 A1  Jan. 16, 2020

(51) Int. Cl.
*B29C 70/38* (2006.01)
*B29C 70/34* (2006.01)
(Continued)

(52) U.S. Cl.
CPC .............. *B29C 70/38* (2013.01); *B29C 70/34* (2013.01); *B64F 5/10* (2017.01); *B65H 16/005* (2013.01);
(Continued)

(58) Field of Classification Search
CPC ....... B65H 16/005; B65H 16/021; B64F 5/10; Y10T 156/1348; Y10T 156/1357;
(Continued)

(56) References Cited

U.S. PATENT DOCUMENTS 3,332,681 A * 7/1967 Gilbert ................. B65H 45/103
270/30.07
4,573,618 A * 3/1986 Kikuchi ............... B65H 45/103
226/42
(Continued)

FOREIGN PATENT DOCUMENTS

EP  2639048 B1  1/2016

OTHER PUBLICATIONS

How to Automate Composite Wind Turbine Blade Fabrication; Nov. 5, 2012; http://www.fabricatingandmetalworking.com/2012/11/how-to-automate-composite-wind-turbine-blade-fabrication/.
(Continued)

*Primary Examiner* — Mark A Osele
*Assistant Examiner* — Christopher C Caillouet
(74) *Attorney, Agent, or Firm* — Timmer Law Group, PLLC

(57) ABSTRACT

A material dispensing system including a first frame and a first application head. The first application head supported by the first frame including a first bias ply assembly comprising a bias ply roll supported on a bias ply dispenser unit, the first bias ply assembly configured to pass bias ply material along a bias path; and a first non-bias ply assembly comprising a non-bias ply roll supported by a non-bias ply dispenser unit, the non-bias ply assembly configured to pass non-bias ply material along a non-bias path; wherein the bias path and the non-bias path are substantially parallel. Another aspect provides a material dispensing system including a first frame and a first application head supported thereby; and a second frame and a second application head supported thereby; wherein the first frame and the second frame move in an X direction during operation. Another aspect includes preparing a composite article.

9 Claims, 11 Drawing Sheets

(51) Int. Cl.
  *B64F 5/10* (2017.01)
  *B65H 16/00* (2006.01)
  *B65H 16/02* (2006.01)
  *B29L 31/30* (2006.01)

(52) U.S. Cl.
  CPC .... *B65H 16/021* (2013.01); *B29L 2031/3082* (2013.01); *B65H 2402/42* (2013.01); *B65H 2701/172* (2013.01); *B65H 2701/174* (2013.01); *Y10T 156/1348* (2015.01); *Y10T 156/1357* (2015.01)

(58) Field of Classification Search
  CPC ....... B29C 70/38; B29C 70/34; B29C 70/545; B29C 70/207
  See application file for complete search history.

(56) References Cited

U.S. PATENT DOCUMENTS

| | | | | |
|---|---|---|---|---|
| 4,591,402 | A | * | 5/1986 | Evans ................... B29C 70/388 156/350 |
| 4,877,193 | A | * | 10/1989 | Vaniglia ................. B29C 70/32 156/574 |
| 6,152,438 | A | | 11/2000 | Morgan |
| 8,557,074 | B2 | * | 10/2013 | McCowin ............. B29C 70/386 156/169 |
| 8,965,571 | B2 | | 2/2015 | Peters et al. |
| 9,321,220 | B2 | | 4/2016 | Slack et al. |
| 9,499,253 | B1 | * | 11/2016 | White ..................... B64C 27/48 |
| 2005/0061422 | A1 | * | 3/2005 | Martin ................. B29C 70/545 156/230 |
| 2016/0082696 | A1 | | 3/2016 | Krasnowski et al. |
| 2016/0195390 | A1 | | 7/2016 | Nissen et al. |
| 2016/0236426 | A1 | | 8/2016 | Slack et al. |
| 2017/0021565 | A1 | | 1/2017 | Deaville |
| 2017/0113422 | A1 | | 4/2017 | Maass |
| 2017/0291701 | A1 | | 10/2017 | Wardlaw et al. |
| 2017/0342227 | A1 | | 11/2017 | Percy |

OTHER PUBLICATIONS

Winding Up Technologies for Better Throughput, Quality; Mar. 14, 2010; https://www.americanmachinist.com/qc-and-inspection/winding-technologies-better-throughput-quality.

New Agile Gantry 5-axis Multi-Processing System from MAG; Jan. 1, 2010; http://www.mfgnewsweb.com/archives/4/33673/Special-Machinery-jan10/New-Agile-Gantry-5-axis-Multi-Processing-System-from-MAG.aspx.

Electroimpact; Composite Manufacturing; https://www.electroimpact.com/Products/Composites/Overview.aspx.

Mtorres; Productivity and flexibility together in a perfect solution; http://www.mtorres.es/en/aeronautics/products/carbon-flber/torreslayup.

* cited by examiner

MATERIAL DISPENSING SYSTEMS

GOVERNMENT RIGHTS

At least some of the subject matter of this application may have been made with government support under contract number NWA6000522-0014. The government may have certain rights in the invention.

BACKGROUND

Field of the Invention

The present disclosure relates, in general, to composite laminates, and in particular, to the manufacture of composite laminates using a material dispensing system.

Description of Related Art

Modern aircraft are manufactured from a wide variety of materials, including steel, aluminum, and a wide variety of composite materials. Most structural components are made from strong, rigid materials. However, in order to conserve weight, the structural components are often made from a thin layer of metal or composite that includes reinforcement strips of material reinforced with stringers.

Tiltrotor aircraft have complicated proprotor assemblies located at opposing wing tips that operate between a helicopter mode to take off, hover, fly, and land like a conventional helicopter; and an airplane mode. The proprotor assemblies are oriented vertically for a helicopter mode and horizontally for airplane mode. Because the tiltrotor aircraft must operate in both helicopter mode and airplane mode, and operate while transitioning between the two, the wing structure must support the weight of the proprotor assemblies, withstand the forces generated from the proprotor assemblies in a variety of modes, and provide a lifting force sufficient to lift the weight of the aircraft.

FIG. 1 is a partial view of an exemplary prior art tiltrotor wing 10 including a torque box structure 30. The torque box structure 30 includes skins 20, forward spar 32, and aft spar 34. The skins 20 includes stringers 12 extending generally parallel to the longitudinal axis of the wing 10. The upper skin 20 requires five stringers 12 and the lower skin 20 requires four stringers 12. The stringers 12 provide stiffness and support to the skin 20 and are each an I-beam shaped stiffener as shown in FIG. 2 connected to the interior surface 20a of the skin 20. The stiffeners 12 are made from a composite material and extend the depth of the skin 20 assembly into the interior of the wing 10 thereby reducing the space available for fuel and other internal systems.

The skin 20 is constructed of many of layers or "plies" of composite materials comprised of hundreds of reinforcement strips 28 or "postage stamps" made of various types, sizes, orientations, and thicknesses of materials. The reinforcement strips 28 are made of graduated sizes of postage stamp stamps that have been compacted together as shown in FIG. 2. The reinforcement strips 28 are located below the stringer 12: (1) to provide support for the skin 20 against catastrophic buckling; (2) to maintain shape and contour of the skin 20; (3) to provide stiffness at the stringer load points; and (4) to distribute pressure into the skin. During manufacture of the skin 20 each reinforcement strips 28 is cut, labeled, and positioned in a mold, which is an extremely time-consuming and laborious process.

Each reinforcement strip 28 is typically cut from a ply of pre-impregnated material (pre-preg) made of reinforcing fibers such as carbon, glass, aramid, and the like, that are bonded together with a thermoplastic polymer. Pre-preg conventionally has been supplied by manufacturers as 0° tape (with all its fibers orientated in one direction in relation to an edge of the pre-preg roll) or 0/90 fabric (continuous fiber in the roll-up direction, 0°, with discontinuous woven or stitched fibers running transverse to the roll-up direction, 90°) having a width between about 75 and 300 mm. Often, to achieve a desired laminate characteristic, the plies of pre-preg are layered with their fibers having different orientations in relation to each other to tailor the structural properties of the laminates. For example, in applications for forming high strength-low weight complex shaped structures it may be desired to apply and form one layer of pre-preg at a time on a tool with one or more of the different layers having different fiber orientations than another layer. Examples of common layer orientations, besides 0 degree and 0/90 degree, include, but are not limited to, 30°, 45°, 60°, 90°, 120°, 135°, and 150°. Combinations of these layer orientations are also needed including, but not limited to, 45°/135°, 60°/150°, 30°/120°.

The cutting and placement of the reinforcement strips 28 in different orientations is a complex process that is tedious and time consuming. Accordingly, automated tape laying (ATL) or automated fiber placement (AFP) machines have been developed to perform these steps. ATL or AFP machines use tapes or tows distributed from a moving head that places and cuts reinforcement strips 28 on a mold or mandrel in an automatic fashion. For instance, ATL machines use one or more tapes each having a width between about 75 and 300 mm, whereas AFP machines use a number of small width tows that are typically less than about 8 mm wide. The fibers in tape are usually oriented at either 0° or 90°. The tape or tow is fed into a roller head, where heat is applied thereto prior to its deposition onto a substrate. The position of the roller head is constantly moving and repositioned for placement of each ply having a desired orientation on the mold. The roller head may also heat the substrate onto which the tape or tow is to be deposited (typically this may be a layer of tape deposited in a previous step). Under pressure from the roller and/or tension, the tape or tow becomes bonded to a substrate as the thermoplastic polymer within the composite, and within the substrate, melts and adheres the tape or tow to the substrate. Then cooling and solidification of the thermoplastic polymer leads to consolidation of the tape as part of the substrate to which it was applied. Typical manufacturing velocities for the rate of laydown of tape are from 0.1 m/min up to 60 m/min, preferably from 1 m/min up to 60 m/min. As production velocities increase, there is a risk that the degree of bonding of the tape or tow to the substrate may decrease and this can lead to the tape or tow delaminating from the substrate. Moreover, depending upon the size and thickness of a composite article for a skin of a tiltrotor wing, complicated robotics repeat complicated placement steps of narrow tape or tow that occur over hours. ATL tends to achieve a much higher deposition rate compared to AFP, but also produces much more waste.

Accordingly, the need has arisen for an improved material dispensing system for the manufacture of composite articles for use on a tiltrotor aircraft that addresses one or more of the foregoing issues.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

SUMMARY

Figure 1:
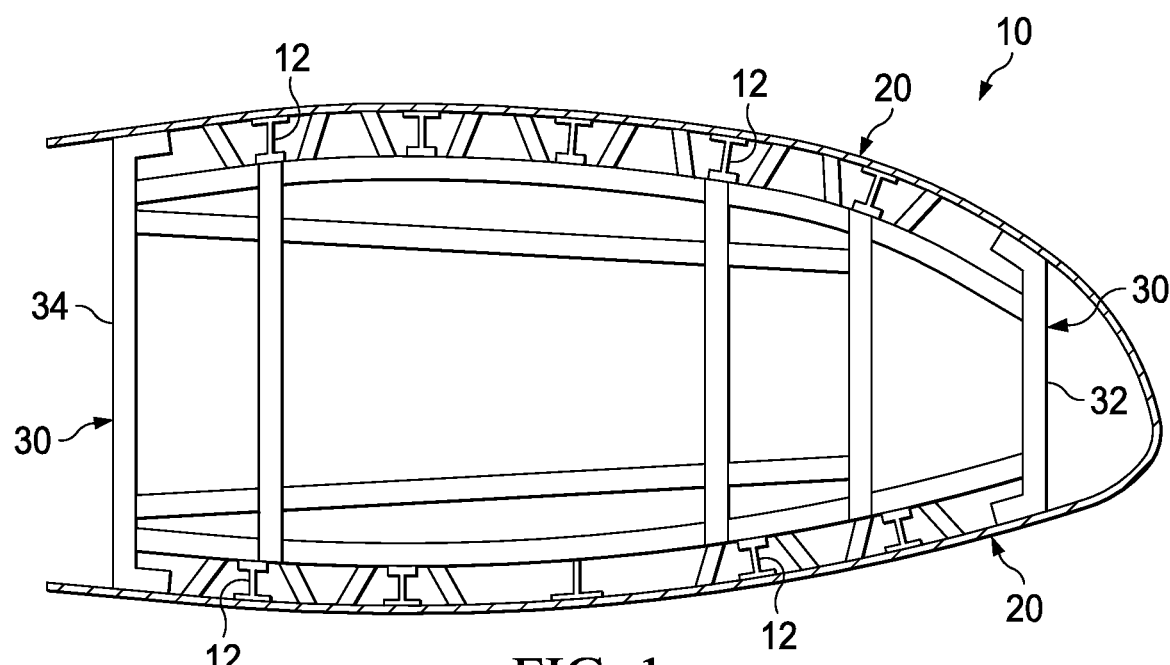
FIG. 1 is a cross-sectional view of a prior art tiltrotor wing.

In a first aspect, there is a material dispensing system including a first frame; and a first application head supported by the first frame including a first bias ply assembly comprising a bias ply roll supported on a bias ply dispenser unit, the first bias ply assembly configured to pass bias ply material along a bias path; and a first non-bias ply assembly comprising a non-bias ply roll supported by a non-bias ply dispenser unit, the non-bias ply assembly configured to pass non-bias ply material along a non-bias path; wherein the bias path and the non-bias path are substantially parallel.

In an embodiment, the first bias ply roll is comprised of a fiber having a bias orientation.

In an exemplary embodiment, the bias orientation is at least one of the following: about 15°, about 30°, about 45°, about 60°, about 75°, about 105°, about 120°, about 135°, about 150°, and about 165.

In an embodiment, the non-bias ply roll is comprised of a fiber having a non-bias orientation.

In another embodiment, the non-bias orientation is at least one of the following: about 0°, about 90°, about 180°, and 270°.

In an illustrative embodiment, at least one of the bias ply roll and the non-bias ply roll are comprised of a ply having a selected width greater than 24 inches.

In an embodiment, the first biased assembly and the first non-biased assembly are in a stacked horizontal configuration on the first application head.

In another embodiment, at least one of the bias ply roll and the non-bias ply roll is a ply of resin impregnated fibers.

In an embodiment, the system includes a cutter slidably coupled to the first application head and configured to cut at least along a width of a bias or non-bias ply.

In yet another embodiment, the system includes an adhesive delivery device.

In an embodiment, the first application head moves only in an X direction during operation.

In an embodiment, the first frame includes at least one of the following: a pair of movable support members, a gantry, and a robotic arm.

In still another embodiment, the movable support members move along a track.

In yet another embodiment, the system is programmable.

In a second aspect, there is a material dispensing system including a first frame; a first application head supported by the first frame, the first application head including a non-bias ply assembly, the non-bias ply assembly configured to pass non-bias ply material along a non-bias path; a second frame; and a second application head supported by the second frame, the second application head including a bias ply assembly, the bias ply assembly configured to pass bias ply material along a bias path; wherein the first frame and the second frame move in an X direction during operation.

In an embodiment, the bias path and the non-bias path are substantially parallel.

In a third aspect, there is a method of preparing a composite article including: providing a first bias assembly with a first bias roll; providing a first non-bias assembly with a first non-bias roll; positioning the first bias assembly to a dispensing position; dispensing a bias ply from the first bias roll along a bias path on a mold; cutting the bias ply; positioning the first non-bias assembly to a dispensing position; dispensing a non-bias ply from the first non-bias roll; and cutting the non-bias ply; wherein the bias path and the non-bias path are substantially parallel.

In an embodiment, the first bias assembly and the first non-bias assembly are disposed on a frame.

In an illustrative embodiment, the first bias assembly is disposed on a first frame and the first non-bias assembly is disposed on a second frame.

In an exemplary embodiment, the method includes a step of cutting a reinforcement strip from at least one of the bias ply and the non-bias ply.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE PREFERRED EMBODIMENT

Illustrative embodiments of material dispensing systems and methods therefor are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 3:
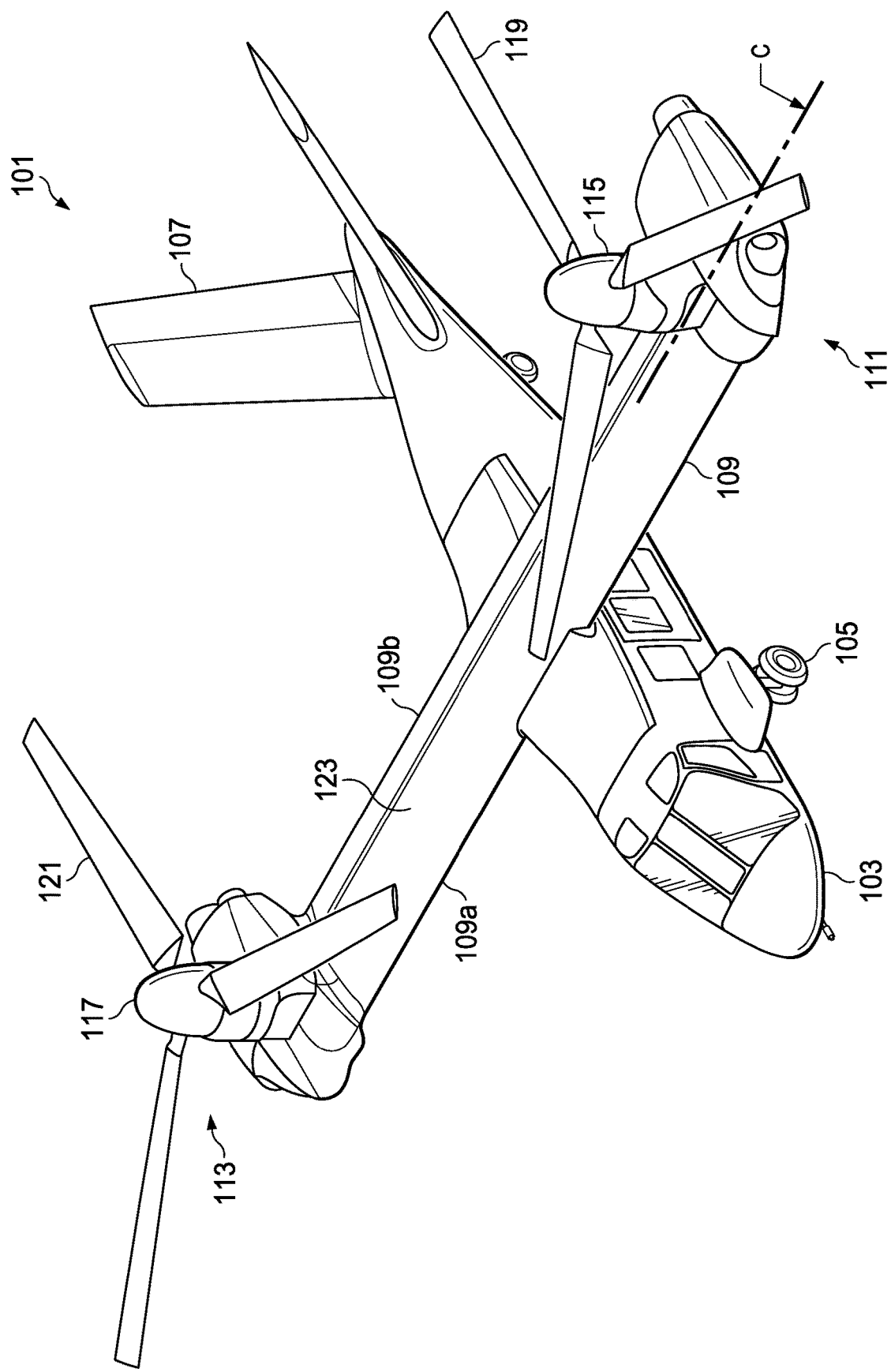
FIG. 3 is a perspective view of a tiltrotor aircraft in helicopter mode, according to one example embodiment.
Figure 4:
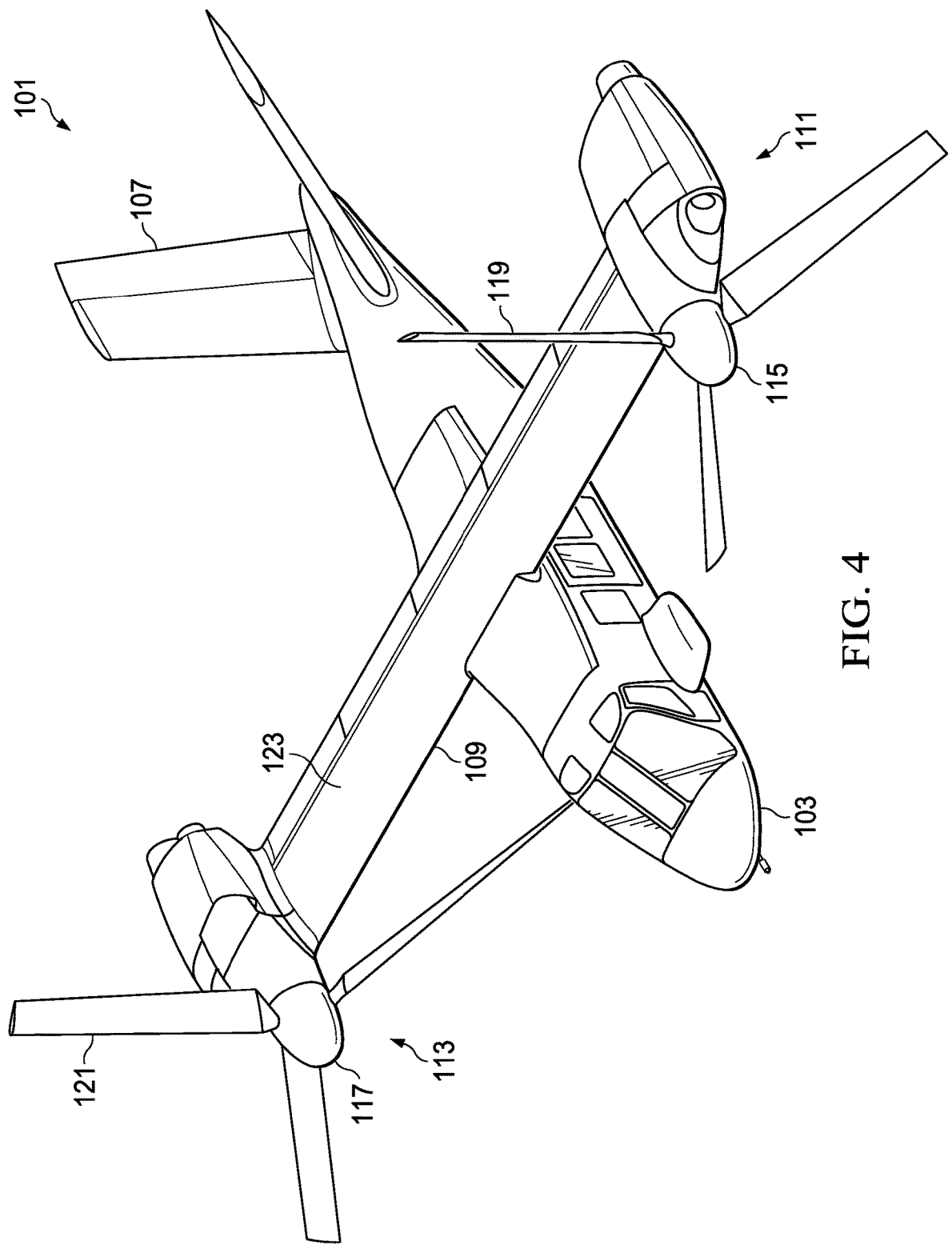
FIG. 4 is a perspective view of a tiltrotor aircraft in airplane mode, according to one example embodiment.

Referring to FIGS. 3 and 4, a tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111, 113 includes a fixed engine and a rotatable proprotor 115, 117, respectively. Each rotatable proprotor 115, 117 have a plurality of rotor blades 119, 121, respectively, associated therewith. The position of proprotors 115, 117, as well as the pitch of rotor blades 119, 121, can be selectively controlled in order to selectively control direction, thrust, and lift of tiltrotor aircraft 101.

FIG. 3 illustrates tiltrotor aircraft 101 in helicopter mode, in which proprotors 115 and 117 are positioned substantially vertical to provide a lifting thrust. FIG. 4 illustrates tiltrotor aircraft 101 in an airplane mode, in which proprotors 115, 117 are positioned substantially horizontal to provide a forward thrust in which a lifting force is supplied by wing 109. It should be appreciated that tiltrotor aircraft can be operated such that proprotors 115, 117 are selectively positioned between airplane mode and helicopter mode, which can be referred to as a conversion mode.

The proprotors 115 and 117 rotate from a conversion axis C located above an upper wing skin 123. An advantage of locating the conversion axis C of the proprotors 115 and 117 above the upper wing skin 123 is that the fore/aft location of the proprotors 115 and 117 can be moved to shift the center of gravity of the aircraft in the various flight modes as described by U.S. Pat. No. 9,174,731, issued Nov. 3, 2015, which is hereby incorporated by reference in its entirety. As such, locating the conversion axis of the proprotors 115 and 117 above the upper wing skin 123 allows the fore/aft location of the proprotors 115 and 117 to be optimized for the center of lift in a particular flight mode.

The aircraft 101 has a maximum range further than a conventional tiltrotor aircraft (wing shown in FIGS. 1 and 2) achieved at least in part by the wing structure including the wing skin 123. The wing structure 109 provides structural support for the propulsion systems 111, 113 and fuselage 103 and lifting force sufficient to lift the weight of the aircraft 101. The wing structure 109 is configured to distribute loads and the shearing motion generated by the propulsion systems 111, 113 during the various flight modes. The improved structural support of the wing member 109 also provides fuel bays having no I-beam projections on the fuel supporting surfaces, which provides more space in the fuel bay for fuel capacity.

This disclosure depicts and describes material dispensing systems and methods relating thereto that can be used to manufacture the wing skin 123 and other composite articles for the tiltrotor wing structure 109. The material dispensing systems, components and features thereof, and methods relating thereto depicted and/or described herein can be used with any aircraft having one or more composite articles, including tiltrotor aircrafts, helicopters, tilt wing aircrafts, unmanned aerial vehicles (UAVs), hovercrafts, and other vertical lift or VTOL aircrafts, or can further be used with any device having a composite component, including devices with propellers, windmills, and turbines. Further, any features of one embodiment of the material dispensing systems and methods relating thereto in this disclosure can be used with any other embodiment of the material dispensing systems and methods in this disclosure such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 5:
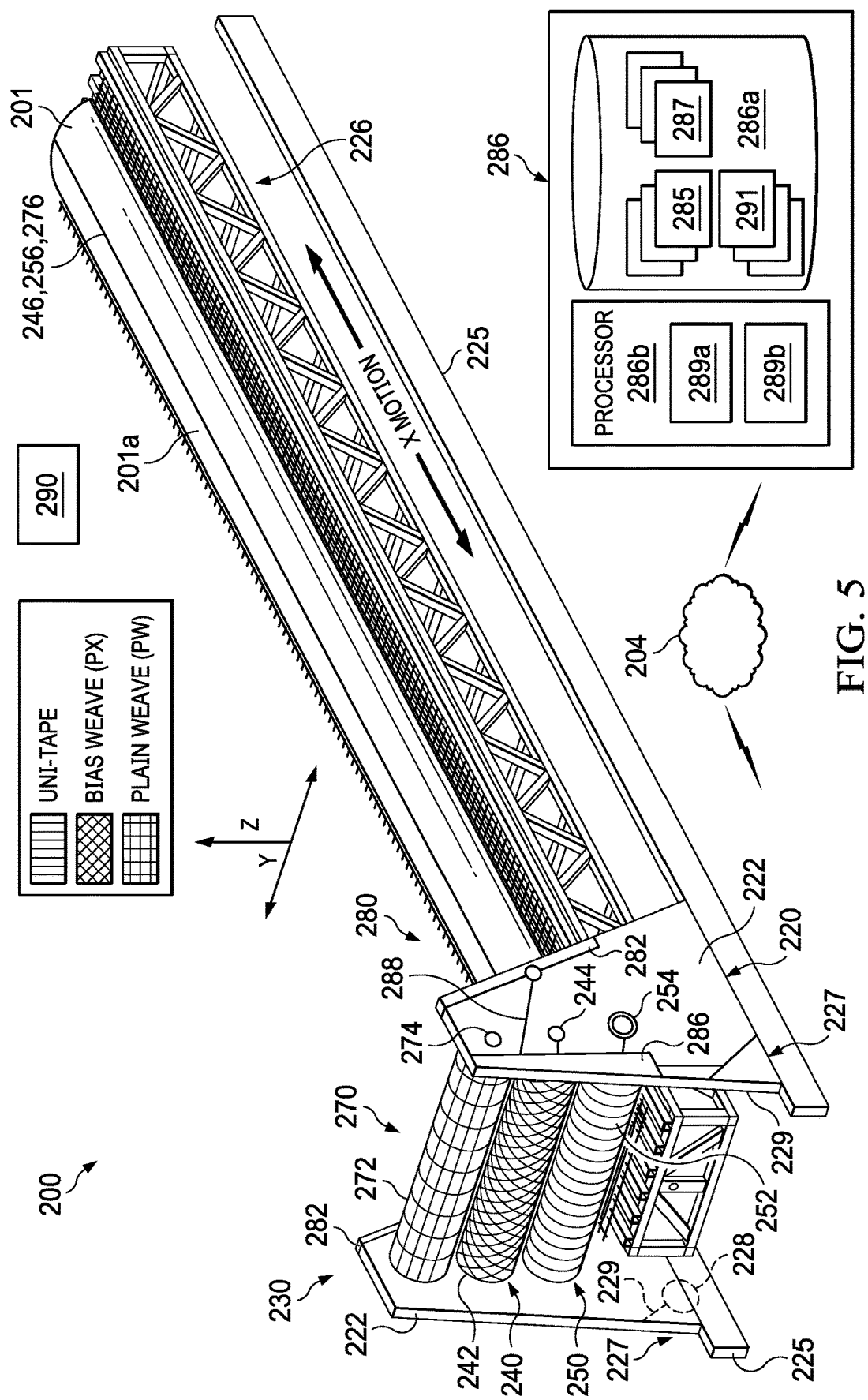
FIG. 5 is a schematic perspective view of a material dispensing system, according to an exemplary embodiment.
Figure 6:
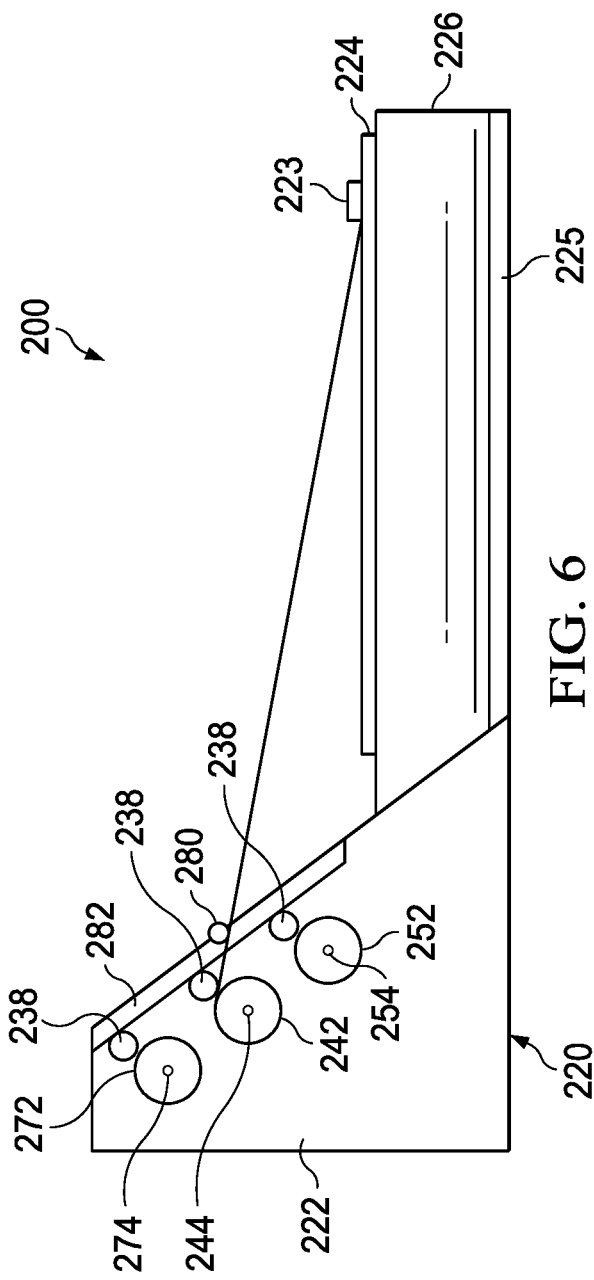
FIG. 6 is a schematic side view of the material dispensing system in FIG. 5.

In an embodiment, as shown in FIGS. 5-6, a material dispensing system 200 includes a first frame 220, a first application head 230 supported by the first frame 220, and a mold 224. The first application head 230 is configured to dispense, cut, and apply plies from a first bias ply assembly 240 and a first non-bias ply assembly 250 onto the mold 224. The mold 224 is disposed on a machine base 226.

In an embodiment, the first frame 220 includes movable support members 222 disposed in a pair of tracks 225. In the illustrative embodiment, the tracks 225 are mounted in the floor; however, in other embodiments, the tracks 225 are mounted to or in a ceiling or a wall. In some illustrative embodiments, the first frame 220 includes a drive system 227 that permits the movable support members 222 to traverse across the tracks 225 during operation. In an embodiment, the drive system 227 includes wheels 228 operably connected to the movable support members 222 and received in a groove in the tracks 225. In an embodiment, the drive system 227 includes an electric motor 229 for driving wheels 228 on tracks 225. In other embodiments, drive system 227 can include sprockets, chains, and/or axles to move support members 222.

In an embodiment, the first frame 220 and the first application head 230 are designed to move in only in an X motion direction as depicted in FIG. 5. The X motion is motion along a longitudinal axis X. The Y motion is motion along the transverse axis Y that is perpendicular to longitudinal axis X. The Z motion is motion along a vertical axis Z. In some embodiments, the first application head 230 is designed to move in a Z motion. Advantageously the first frame 220 and the first application head 230 cannot and do not move in a Y motion, which eliminates robotic placement systems used in ATL and AFT machines. Accordingly, the material dispensing system 200 reduces operating costs, manufacturing time, and maintenance as compared to conventional placement systems (e.g., ATL and AFT machines).

In an illustrative embodiment, the first application head 230 is disposed generally at the top and front of the first frame 220. The first application head 230 includes one or more first bias ply assemblies 240 (e.g., a second, third, fourth, or fifth bias ply assemblies). The number and size (width) of the bias ply assemblies can depend on the type of the bias material and desired orientation of the bias ply material desired for the composite. The first application head 230 can include one or more first non-bias ply assemblies (e.g., a second, third, fourth, or fifth bias ply assemblies). The number and size (width) of the non-bias ply assemblies can depend on the type of non-bias material and desired orientation of the non-bias ply material desired for the composite.

In the illustrative embodiment, the first application head 230 includes the first biased assembly 240, the first non-biased assembly 250, and, optionally, a second non-biased assembly 270 in a stacked horizontal configuration such that the longitudinal axis of each assembly 240, 250, 270 is substantially perpendicular to the tracks 225 during operation. In other embodiments, the first application head 230 can comprise a platform on the first frame 220 with mounting brackets for supporting the first biased assembly 240 and the first non-biased assembly 250.

The first bias ply assembly 240 includes first a bias ply roll 242 supported on a bias ply dispenser unit 244. The bias ply roll 242 is comprised of one ply of a tape or fabric having a selected width that is composed of fibers having a bias orientation. The fabric of the bias ply roll 242 can be comprised of a bidirectional weave (for example, but not limitation, 45° and 135°) in a biased orientation. The bidirectional weave can include at least one of the following, but is not limited to, a plain weave, 8 harness satin weave, 4 shaft satin weave, 8 shaft satin weave, crowfoot satin weave, 5 harness satin weave, and 8 shaft satin weave. The tape of the bias ply roll 242 can be comprised of unidirectional fibers (not woven) in a biased orientation. In an exemplary embodiment, the selected width is at least one of the following: greater than 24 inches, greater than 48 inches, greater than 50 inches, greater than 60 inches, greater than 64 inches. The selected width of the bias ply roll 242 is greater than ATL or AFP machines so as to substantially increase the manufacturing and reduce the complexity of the system 200 as compared to conventional ATL or AFP machines. The fibers in the bias ply roll 242 can be continuous filaments or fibers including one or more of glass, carbon, graphite, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like.

In addition, the fibers of the bias ply roll 242 have a bias orientation. Bias orientation means a fiber having an oblique angle relative to center axis 201a (e.g., an oblique angle is neither parallel nor at right angles to center axis 201a). For example, the bias orientation is a fiber having an angle not oriented at either 0°, 90°, 180°, or 270° relative to a center axis 201a of the composite article. In an embodiment, the bias orientation of the fiber has angle of in varying orientations about 15°, about 30°, about 45°, about 60°, about 75°, about 105°, about 120°, about 135°, about 150°, and/or about 165° relative to the center axis 201a of the composite article; however, it should be appreciated that the bias orientation of a fiber can be any angle having an oblique orientation (e.g., any angle more than 0° and less than 90°, greater than 90° and less than 180°, greater than 180° and less than 270°, and greater than 270° and less than) 360°. In the illustrative embodiment shown in FIG. 5, the first bias ply roll 242 is a ply with a bias weave fabric having a bias orientation of about 45° and 135°. In another exemplary embodiment, a ply 212 of unidirectional tape having a bias orientation of about 45° in FIG. 7A. In another illustrative embodiment shown in FIG. 7B, plies 212, 215 of unidirectional tape have a bias orientation of about 45° and plies 213, 214 of unidirectional tape have a bias orientation of about 135°.

The bias ply dispenser unit 244 can be a conventional fabric dispensing drive. In an embodiment, the bias ply dispenser unit 244 is a variable speed drive to dispense the bias ply from the bias ply roll 242 onto the mold 224.

The first bias ply assembly 240 is configured to pass bias ply material along a bias path 246. The bias path 246 is parallel to the tracks 225. In the illustrative embodiment, the bias path 246 is parallel to the longitudinal and center axis 201 of the composite article 201. It will be appreciated that one of the novel features of the material dispensing systems and methods herein is the use of a bias ply roll 242 with fibers having a bias orientation. Advantageously the fibers in the bias orientation in the bias ply roll 242 permit the mere dispensing of the ply from the first bias ply assembly along the bias path 246. The orientation of the first bias ply roll 242 and assembly 240 remains perpendicular to the longitudinal and center axis 201 of the composite article 201 during operation of the system 200, thereby increasing dispensing velocities and eliminating complex and expensive dispensing heads used by ATL and AFP machines.

The first non-bias ply assembly 250 includes first a non-bias ply roll 252 supported on a non-bias ply dispenser unit 254. The non-bias ply roll 252 is comprised of one ply of a tape or fabric having a selected width that is composed of fibers having a non-bias orientation. The fabric of the non-bias ply roll 252 can be comprised of a bidirectional weave (for example, but not limitation, 0° and 90°) in a non-biased orientation. The bidirectional weave can include at least one of the following: a plain weave, 8 harness satin weave, 4 shaft satin weave, 8 shaft satin weave, crowfoot satin weave, 5 harness satin weave, and 8 shaft satin weave. The tape of the non-bias ply roll 252 includes, but is not limited to, unidirectional fibers (not woven) in a non-biased orientation (for example, but not limitation, fibers at 0° or 90° relative to the center axis 201a). Tape of the non-bias ply roll is commonly referred to as Uni. In an exemplary embodiment, the selected width is at least one of the following: greater than 24 inches, greater than 48 inches, greater than 50 inches, greater than 60 inches, greater than 64 inches. The selected width of the non-bias ply roll 252 is greater than ATL or AFP machines so as to substantially increase the manufacturing and reduce the complexity of the system 200 as compared to conventional ATL or AFP machines. The fibers in the non-bias ply roll 252 can be continuous filaments or fibers including one or more of glass, carbon, graphite, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like.

In addition, the fibers of the non-bias ply roll 252 have a non-bias orientation. A non-bias orientation is a fiber having an angle that is parallel or at right angles to center axis 201a (e.g., the fiber is oriented at about 0°, about 90°, about 180°, or about 270° relative to center axis 201a of the composite article). In the illustrative embodiment shown in FIG. 5, the first non-bias ply roll 252 includes, but is not limited to, unidirectional tape having a non-bias orientation of about 0°. In another exemplary embodiment shown in FIG. 7A, a ply 210 of unidirectional tape has a non-bias orientation of about 0° and a ply 211 of plain weave fabric has fibers in non-bias orientations of about 0° and 90°. In another illustrative embodiment shown in FIG. 7B, plies 210, 217 of unidirectional tape have a non-bias orientation of about 0° and plies 211, 216 of unidirectional tape have a non-bias orientation of about 90°.

The non-bias ply dispenser unit 254 can be a conventional fabric dispensing drive. In an embodiment, the non-bias ply dispenser unit 254 is a variable speed drive to dispense the non-bias ply from the non-bias ply roll 252 onto the mold 224.

The first non-bias ply assembly 250 is configured to pass a non-bias ply material along a non-bias path 256. The non-bias path 256 is parallel to the tracks 225. In the illustrative embodiment, the non-bias path 256 is parallel to the longitudinal and center axis 201 of the composite article 201. The orientation of the first non-bias ply roll 252 and assembly 250 remains perpendicular to the longitudinal and center axis 201 of the composite article 201 during operation of the system 200. In an embodiment, bias path 246 and the non-bias path 256 are substantially parallel and, in the illustrative embodiment, the bias and non-bias paths 246, 256 are substantially identical, which can improve dispensing velocities and eliminating complex and expensive dispensing heads used by ATL and AFP machines.

In some embodiments, as shown in FIG. 5, the first application head 230 includes a second non-bias ply assembly 270 comprising a second non-bias ply roll 272 supported by a second non-bias ply dispenser unit 274. The second non-bias ply assembly 270 is configured to pass non-bias ply material along a second non-bias path 276. In an embodiment, bias path 246 and the first and second non-bias paths 256, 276 are substantially parallel and, in the illustrative embodiment, the bias and first and second non-bias paths 246, 256, 276 are substantially identical. In the illustrative embodiment shown in FIG. 5, the second non-bias ply roll 272 is a plain-weave fabric having a non-bias orientation of about 0° and about 90°.

During operation, as illustrated in FIGS. 5-6, the first application head 230 is positioned on the track 225 for dispensing a selected ply from the ply roll (e.g., rolls 242, 252, or 272) for a desired ply layout. In an exemplary embodiment shown in FIG. 6, each ply roll is associated with a tension member 238 to impart tension on the ply as it is being placed on the mold 224. The tension member 238 is supported by the first application head 230. In an embodiment, an end of the ply can be secured to the mold 224 by a conventional means such as a material clamp or weight 223. In an embodiment, as the first frame 220 moves on the tracks 225 to the selected position for the desired ply location on the mold 224, the ply is dispensed from the respective roll 242, 252, 272. In some embodiments, sensors on the mold 224 can be in communication with a control computer 286 that controls and drives the bias and non-bias dispenser units 244, 254, 274 to dispense a ply onto the mold 224.

In an illustrative embodiment, as shown in FIGS. 5-6, the first application head 230 includes a cutter 280. The cutter 280 is slidably coupled to the front surface of the first application head 230 and is configured to cut at least along the width of the plies being dispensed therefrom. In an embodiment, the cutter 280 slides across the width of the plies as well as vertically along a track 282. In some embodiments, the cutter can be movable and configured to perform the step of cutting a ply from at least one roll 242, 252, 272 and, optional, the step of cutting a ply reinforcement strip from a ply on at least one roll 242, 252, 272. In some embodiments, the step of cutting occurs as the ply is dispensed from the respective roll 242, 252, 272. In some embodiments, the cutter 280 performs the step of cutting when the ply is dispensed and at least partially on the mold 224. In some embodiments, the cutter 280 is a laser cutter and/or other suitable device. In some embodiments, the cutter 280 can perform the step of trimming. In an embodiment, the cutter 280 is in communication with the control computer 286 to selectively adjust the cutting and trimming of the ply.

Once the ply and/or reinforcement strip has been dispensed, cut, and positioned onto the mold 224, the first application head 230 is repositioned and the process starts again until the layers of the composite article 201 are complete.

In an embodiment, the material dispensing system 200 includes a control computer 286 communicably connected to at least one controllable components (e.g., the dispenser units 244, 254, 274; the drive system 227; the cutter 280). In an embodiment, the control computer 286 is connected via wires 288 or through a wireless network 204. The control computer 286 can be programmable to optimize ply dispensing, placement, and cutting as described herein with regard to the control computer 286. The control computer 286 includes memory 286a and a processor 286b. The memory 286a stores ply layout parameters 287 for composite articles including the bias orientation, non-bias orientation, weave, type of ply (e.g., tape or fabric) etc. The processor 286b includes a programming module 289a for generating dispensing, placement, and cutting programs and a validation module 289b for validating the results. At a high level, the programming module 289a receives a selection of a component and ply layout parameters and selects a configuration for the first application head 230 and operating parameters 285 for the dispensing, placement, and cutting steps. The programming module 289a evaluates sequences of motions based on the ply layout geometry identified in the ply layout parameters 287 and selects a sequence of motions based on, for example, but not limitation, the compressive strength of the composite article 201. Once selected, the programming module 289a automatically generates a dispensing, placement, and cutting program 291 based on the selected sequence of motions and the operating parameters 285. The programming module 289a can transmit the dispensing, placement, and cutting program 291 to the material dispensing system 200 through the network 204. In an embodiment, the dispensing, placement, and cutting program 291 is reviewed by a validation module 289b. The validation module 289b evaluates a model of a composite article generated from the dispensing, placement, and cutting program 291 to ensure the composite article will meet operating specifications.

As for a more detailed description of the illustrated implementation, the control computer 286 includes memory 286a and the processor 286b and comprises an electronic computing device operable to receive, transmit, process and store data associated with system 200. For example, the control computer 286 may be any computer or processing device such as a mainframe, a blade server, general-purpose personal computer (PC), Macintosh, workstation, Unix-based computer, or any other suitable device. Generally, FIG. 5 provides merely one example of a computer that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 5 illustrates one control computer 286 that may be used with the disclosure, system 200 can be implemented using a pool of computers.

Memory 286a may include any memory or database module and may take the form of volatile or non-volatile memory including magnetic media, optical media, Random Access Memory (RAM), Read Only Memory (ROM), removable media, or any other suitable local or remote memory component. In the illustrated implementation, memory 286a includes operating parameters 285, ply layout parameters 287, and dispensing, placement, and cutting program 291. Ply layout parameters 287 include one or more entries or data structures that identify ply geometry, bias orientation, non-bias orientation, and associated features.

Operating parameters 285 include any parameters, variables, algorithms, instructions, rules, objects or other directives for operating a particular material dispensing system 200 to perform dispensing, placement, and cutting of plies from rolls 242, 252, 272 for a composite article 201.

The dispensing, placement, and cutting program 291 is any application, program, module, process, or other software that may generate commands to execute dispensing, placement, and cutting of plies from rolls 242, 252, 272 using the material dispensing system 200. For example, the dispensing, placement, and cutting program 291 may generate commands to control the position of the first frame 220 (via drive system 227) through a sequence of motions or paths and stopping at predefined points for dispensing, placement, and cutting of a ply at specific locations on the mold 224.

The control computer 286 also includes the processor 286b. Processor 286b executes instructions and manipulates data to perform the operations of the control computer 286 such as, for example, a central processing unit (CPU). Although FIG. 5 illustrates a single processor 286b in the control computer 286, multiple processors 286b may be used according to particular needs and reference to the processor 286b is meant to include multiple processors 286b where applicable. As illustrated, the processor 286b includes the programming module 289a and the validation module 289b.

The programming module 289a can include any software, hardware, firmware, or combination thereof to automatically generate operating parameters 285. For example, the programming module 289a may receive a selection of a composite article and generate operating parameters 285 based on a model for the selected composite article.

The validation module 289b can include any software, hardware, firmware, or combination thereof configured to evaluate a composite article generated from the dispensing, placement, and cutting program 291 to ensure the generated composite article will meet operating specifications.

Network 204 facilitates wireless or wireline communication between the control computer 286 and the material dispensing system 200. Network 204 may communicate, for example, Internet Protocol (IP) packets, Frame Relay frames, Asynchronous Transfer Mode (ATM) cells, voice, video, data, and other suitable information between network addresses. Network 204 may include one or more local area networks (LANs), radio access networks (RANs), metropolitan area networks (MANs), wide area networks (WANs), all or a portion of the global computer network known as the Internet, and/or any other communication system or systems at one or more locations. As appropriate, the control computer 286 generates requests and/or responses and communicates them to another client, user, server, or other computer systems located in or beyond network 204.

In some embodiments, the material dispensing system 200 is not programmable.

Figure 7A:
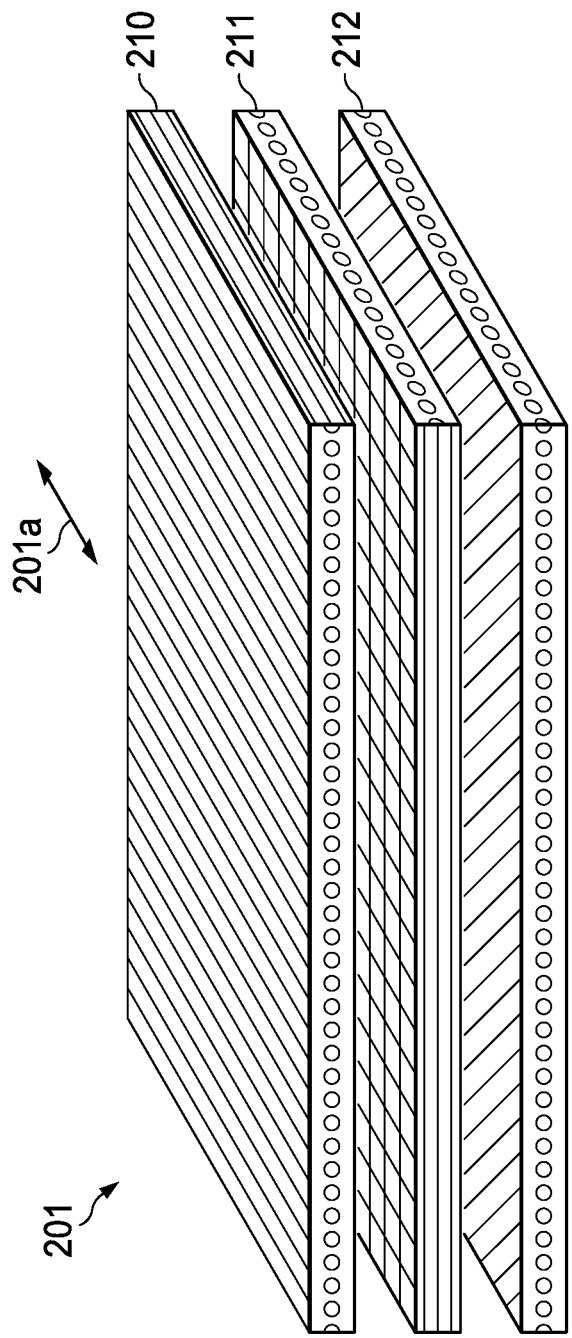
FIG. 7A is a perspective, section view of a bias ply and non-bias plies, according to an illustrative embodiment.

The configuration of the rolls 242, 252, 272 can be selectively adjusted for the desired ply layout (e.g., the desired order and orientation of the ply) for the particular composite article 201 being formed. FIG. 7A illustrates an exemplary ply layout for plies dispensed and cut from rolls 242, 252, 272. Ply 210 is an exemplary embodiment of a ply of unidirectional tape having a non-bias orientation of about 0° dispensed from the first non-bias ply roll 252. Ply 211 is an exemplary embodiment of a ply of plain weave fabric having a non-bias orientation of about 0° and about 90° dispensed from the second non-bias ply roll 272. Ply 212 is an exemplary embodiment of a ply of bias weave fabric having a bias orientation of about 45° and about 135°.

Figure 7B:
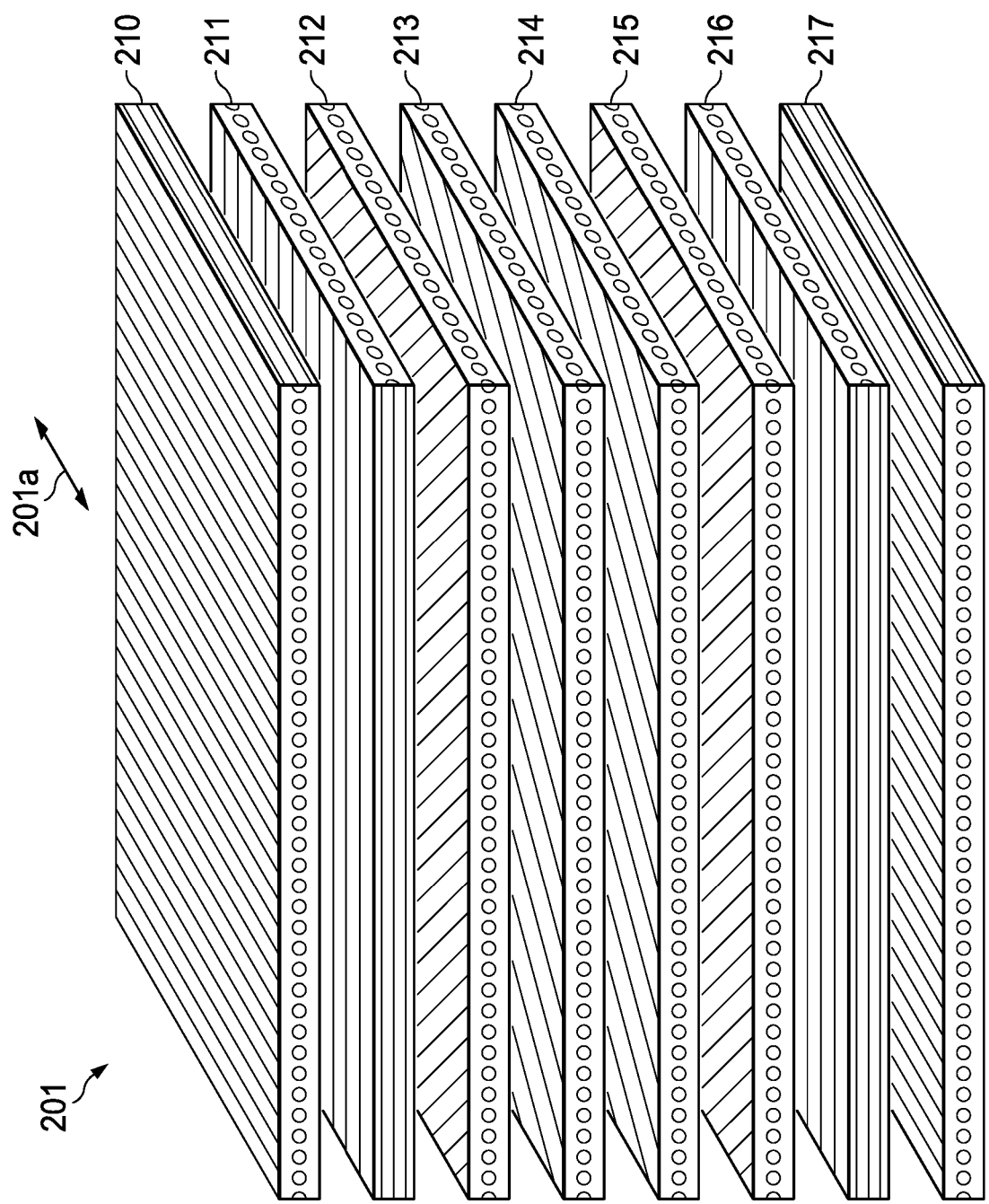
FIG. 7B is a perspective, section view of bias plies and non-plies, according to an exemplary embodiment.

Another illustrative embodiment of a desired ply layout for a composite article 201 is shown in FIG. 7B. The layout in FIG. 7B includes two plies of unidirectional fabric 210, 217 having a non-bias orientation of about 0° dispensed from the first non-bias ply roll 252. Two plies of a unidirectional fabric 211, 216 having a non-bias orientation of about 90° would be dispensed from a third non-bias ply roll (not shown) disposed on the first application head 230. Two plies of bias unidirectional fabric 212, 215 having a bias orientation of about 45° would be dispensed from a second bias ply roll (not shown) disposed on the first application head 230. Two plies of bias unidirectional tape 213, 214 having a bias orientation of about 135° would be dispensed from a third bias ply roll (not shown) disposed on the first application. In this illustrative embodiment, the first application head 230 includes four rolls having different ply orientations/weaves and includes at least one bias ply roll 242; however, it should be appreciated that other embodiments may have fewer or more rolls but include at least one bias ply roll 242.

In an embodiment, the material dispensing system 200 dispenses and cuts tape and/or fabric that are dry fibers that can be wetted with a polymeric matrix either by hand or by injecting the polymeric matrix into a closed mold via an adhesive deliver device 290, as schematically shown in FIG. 5. In an embodiment, the polymeric matrix can be a film, paste, or liquid. In an embodiment, the polymeric matrix can be any suitable resin system, such as a thermoplastic or thermosetting resin. Other exemplary resins can include epoxy, polyimide, polyamide, bismaleimide, polyester, vinyl ester, phenolic, polyetheretherketone (PEEK), polyetherketone (PEK), polyphenylene sulfide (PPS), and the like.

In another embodiment, the fibers are impregnated or otherwise situated in a polymeric matrix as a ply of pre-preg on one or more of the rolls 242, 252, and/or 272. In an embodiment, the pre-preg ply can be an intermediate modulus epoxy resin impregnated carbon fiber fabric on a roll. The intermediate modulus epoxy impregnated carbon fiber fabric can be stiffer than conventional composite fabrics which allows for fewer plies, which reduces the weight and manufacturing cost, while the epoxy resin system can provide tolerance to damage. In an embodiment, a pre-preg ply is dispensed from a roll (e.g., roll 242, 252, 272) and cut via cutter 280. The step of dispensing can include smoothing the plies to remove any pockets of air using compaction member. In some exemplary embodiment, the compaction member comprises a compaction roller that moves independently from the first application head 230.

Once the fibers are in a polymeric matrix, heat and/or pressure can be used to cure the plies in the polymeric matrix. Once cured, the component may then be machined to its final shape.

Figure 8:
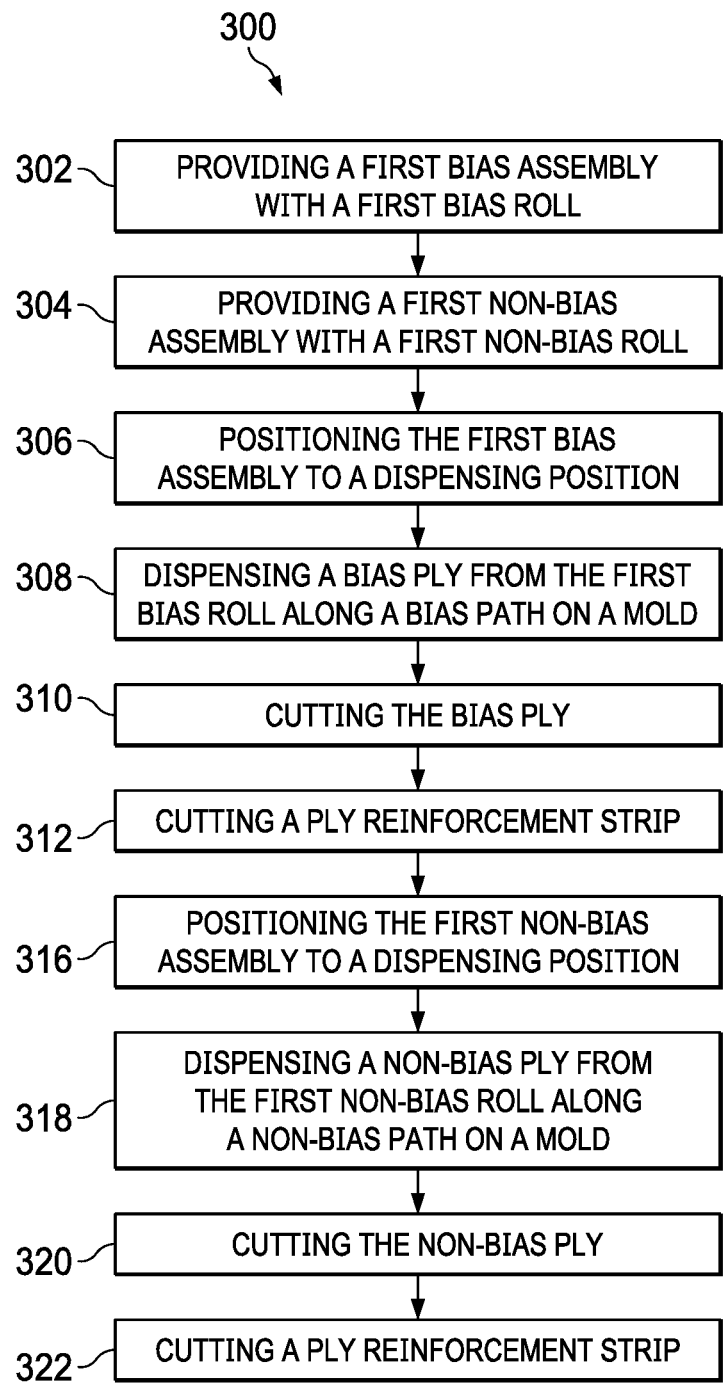
FIG. 8 is a flow diagram of a method of preparing a composite article, according to an exemplary embodiment.

FIG. 8 is a flowchart illustrating an example method 300 for preparing a composite article using the material dispensing system 200. Method 300 is described with respect to system 200 of FIG. 5. Though, systems 400, 500, and 600 contemplate using or implementing any suitable technique for performing these and other tasks. Method 300 is for illustration purposes only and that the described or similar techniques may be performed at any appropriate time, including concurrently, individually, or in combination. In addition, many of the steps in this flowchart may take place simultaneously and/or in different orders than as shown. Moreover, systems 200, 400, 500, and 600 may use methods with additional steps, fewer steps, and/or different steps, so long as the methods remain appropriate.

Method 300 includes the following steps: a step 302 of providing a first bias assembly with a first bias roll, a step 304 of providing a first non-bias assembly with a first non-bias roll, a step 306 of positioning the first bias assembly to a dispensing position, a step 308 of dispensing a bias ply from the first bias roll along a bias path on a mold, a step 310 of cutting the bias ply, an optional step 312 of cutting a ply reinforcement strip, a step 316 of positioning the first non-bias assembly to a dispensing position, a step 318 of dispensing a non-bias ply from the first non-bias roll along a non-bias path on a mold, a step 320 of cutting the non-bias ply, and an optional step 322 of cutting a ply reinforcement strip. The bias path and the non-bias path are parallel. In some embodiments, the bias path and non-bias path are substantially identical.

In some embodiments, the method 300 includes a step of trimming a ply layup on the mold.

Figure 9:
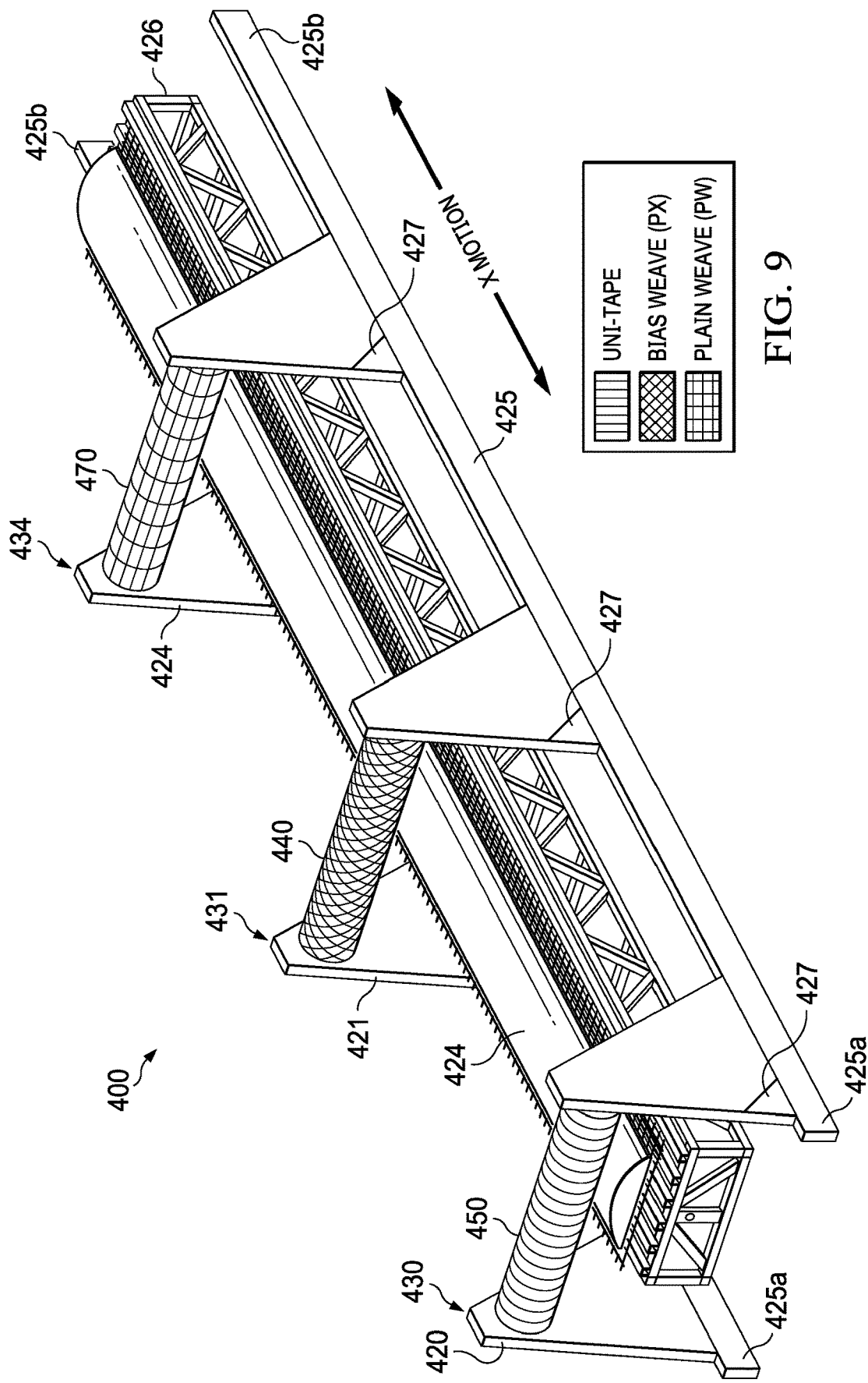
FIG. 9 is another embodiment of a material dispensing system with a plurality of dispensing heads, according to an illustrative embodiment.

FIG. 9 is another example of a material dispensing system 400. Certain components of the material dispensing system 400 are as described above in connection with the material dispensing system 200. Those components bear similar reference characters thereto, but with a leading '4' rather than a leading '2'. The material dispensing system 400 includes a first frame 420, a second frame 421, and a third frame 424 (e.g., a plurality of frames). The first frame 420 includes a first application head 430; the second frame 421 includes a second application head 431, and the third frame 424 includes a third application head 434. Each of the first, second, and third frames 420, 421, 424 can move along tracks 425. Tracks 425 include an additional storage tracks 425a, 425b to permit the first and second frames to be stored therein when not in operation. The first, second, and third frames 420, 421, 424 can be operatively coupled to a drive system 427 such that the first, second, and third frames move only in an X direction during dispensing, placement, and cutting processes. The first, second, and third frames 420, 421, 424 can be driven independently by the drive system 427 (e.g., only the first frame 420, the second frame 421, or the third frame 424 at one time). In other embodiments, more than one first, second, and third frames 420, 421, 424 move along tracks 225 during operation. The material dispensing system 400 can include a network 404 and control computer 486 as described above with respect to system 200 although not shown in FIG. 9.

The first, second, and third application heads 430, 431, 434 each include only one biased assembly 440 or non-biased assembly 450, 470. In the illustrative embodiment, the first application head 430 includes a first non-biased assembly 450; the second application head 431 includes a biased assembly 440, and the third application head 434 includes a second non-biased assembly 470. In an embodiment, the system 400 with a plurality of frames (e.g., frames 420, 421, 424) includes at least one biased assembly 440.

The configuration of the first, second, and third frames 420, 421, 424 and the respective first, second, and third heads 430, 431, 434 can be selectively adjusted for the desired ply layout. For example, more or less frames can be included in system 400 to add additional biased and/or non-biased assemblies. In an embodiment, the system 400 with a plurality of frames are configured such that each frame includes only one biased or non-biased assembly.

Figure 10:
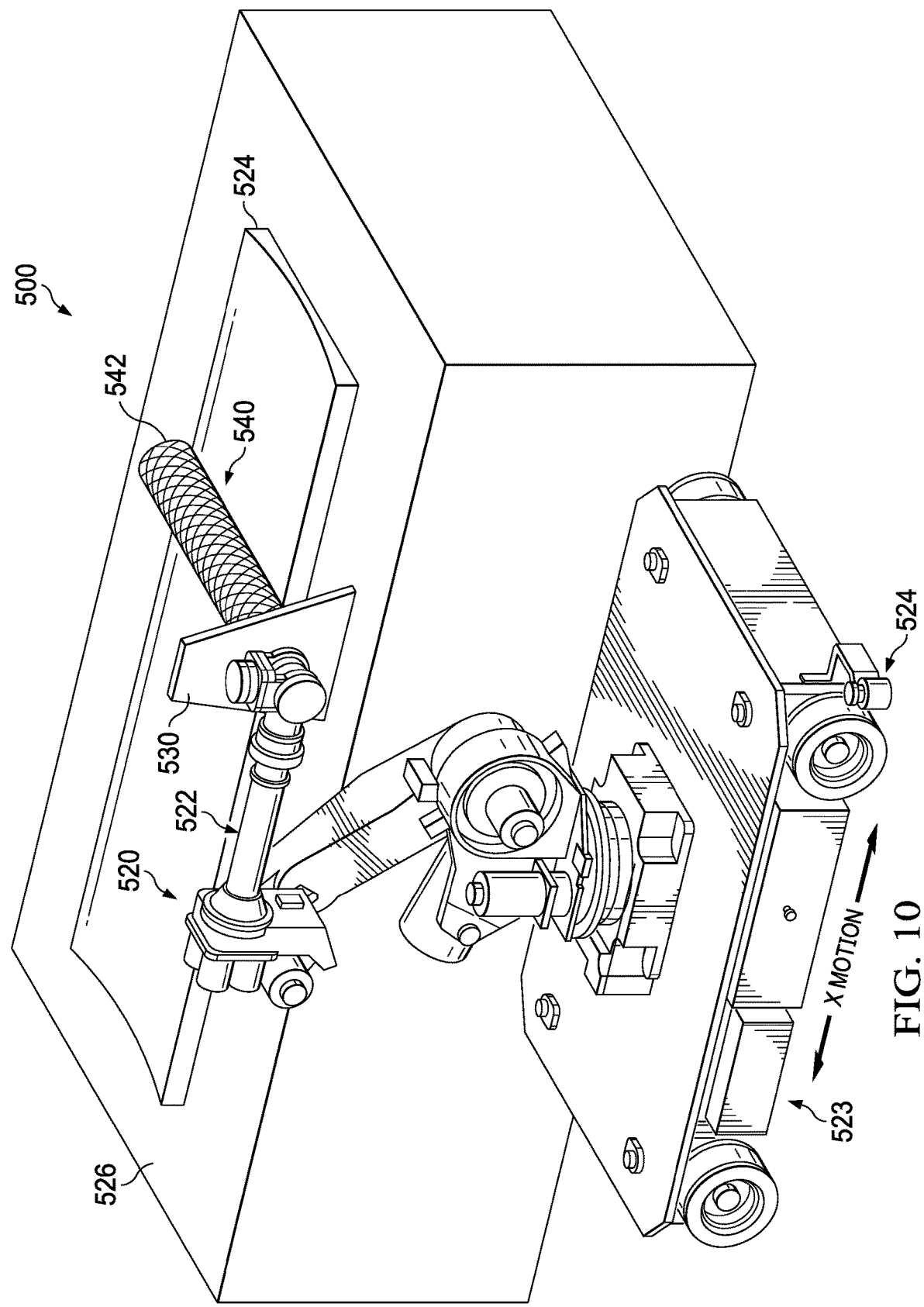
FIG. 10 is an embodiment of a material dispensing system where the frame is a robotic arm.

FIG. 10 is another example of a material dispensing system 500. Certain components of the material dispensing system 500 are as described above in connection with the material dispensing system 200. Those components bear similar reference characters thereto, but with a leading '5' rather than a leading '2'. FIG. 10 illustrates an example of the first frame 220 comprising a robotic arm 520. The robotic arm 520 may navigate or otherwise move through a manufacturing factory and position itself adjacent to mold 224 and execute the dispensing, placement, and cutting process described herein. In an embodiment, the robotic arm 520 moves along a pair of tracks as shown in FIG. 5 to perform the dispensing, placement, and cutting process. The material dispensing system 500 includes a network 504 and control computer 586 as described above with respect to system 200 although not shown in FIG. 10.

In an embodiment, the robotic arm 520 includes, a support member 522, a mobile platform 523, a monitoring system 524, and a first application head 530. The first application head 530 is mounted on the support member 522, and the support member 522 is mounted on the mobile platform 523. The mobile platform 523 is configured to navigate through a manufacturing facility to a position proximate mold 224, and the support member 522 is configured to move the first application head 530 to predefined position at least proximate and above the mold 224. During operation, the support member is configured to move during the dispensing, placement, and cutting processes such that the bias path and non-bias paths 246, 256 are parallel. In some embodiments, the bias path and the non-bias paths 246, 256 are substantially identical.

The robotic arm 520 can include any software, hardware, firmware, or a combination thereof configured to move in multiple axes or degrees of freedom. As illustrated, the support member 522 includes links connected by joints that enable rotational motion or translational displacement. In the illustrated implementation, the support member 522 enables motion in 6 axes such as X, Y, Z, pitch, yaw, and roll. Using these multiple axes, the robotic arm 520 can be configured to move the first application head 230 to multiple predefined positions at least proximate and above the mold 224.

The mobile platform 523 can include any software, hardware, firmware, or a combination thereof configured to navigate or otherwise move through a facility (e.g., manufacturing facility). The mobile platform 523 may determine locations using positing data such as radio frequency identifier (RFID) signals, global positioning system (GPS), indoor GPS, photogrammetry, laser tracking, optical CMM, or others. In some instances, the mobile platform 523 is an omni-directional platform allowing for motion in any direction. In some implementations, the mobile platform 523 includes a positioning and safety monitoring system 524 configured to monitor the environment. In some examples, the positioning and safety monitoring system 524 may be configured to scan (e.g., continuously scan) the working envelope to monitor for human movement or obstructions. In some examples, the positioning and safety monitoring system 524 may be configured to provide position feedback to the control computer 286.

Figure 11:
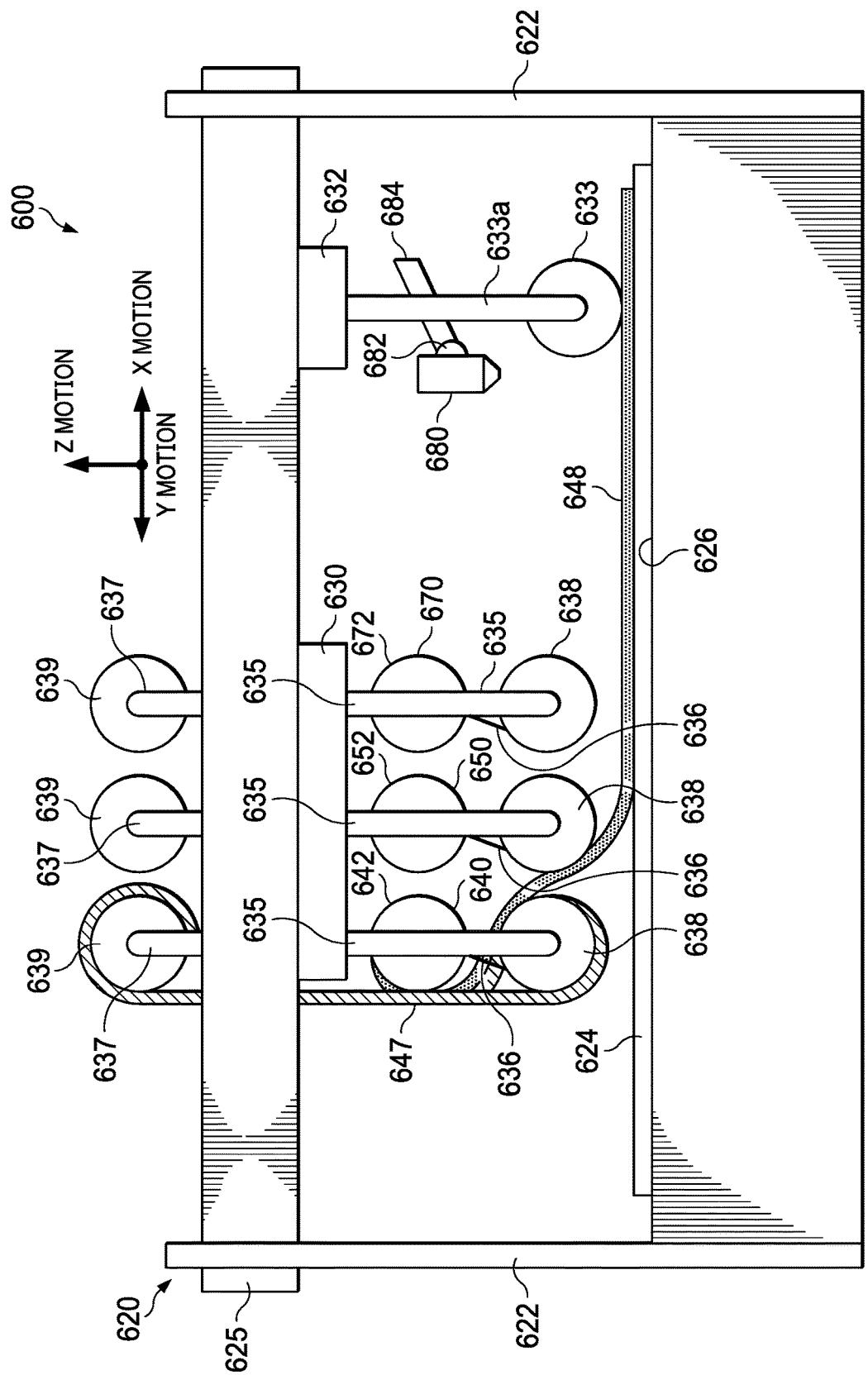
FIG. 11 is an embodiment of a material dispensing system where the frame is a gantry, according to an exemplary embodiment.

FIG. 11 is another example of a material dispensing system 600. Certain components of the material dispensing system 200 are as described above in connection with the material dispensing system 200. Those components bear similar reference characters thereto, but with a leading '6' rather than a leading '2'. FIG. 11 illustrates an example of the first frame 220 comprising a gantry 620. The gantry 620 includes a pair of rails 625 supported by stationary support members 622. The pair of rails 625 support a first application head 630 configured to move in at least an X motion direction. In the embodiment shown, the gantry 620 is stationary and the first application head 630 moves to a position for dispensing plies from at least one first biased assembly 640 onto the mold 626. In some embodiments, the first application head 630 is configured to move only in an X motion direction. In other embodiments, the first application head 630 is configured to move in X, Y, and Z motions. The material dispensing system 600 includes a network 604 and control computer 686 as described above with respect to system 200 although not shown in FIG. 11.

In an embodiment, a mold 624 is disposed on a machine base 626. In the illustrative embodiment, the machine base 626 is disposed between the stationary support members 622. In other embodiments, the machine base 626 is disposed along the transverse axis Y (e.g., generally perpendicular to the pairs of rails 625, which are aligned with the longitudinal axis X).

In the illustrative embodiment, the first application head 630 includes the first biased assembly 640, the first non-biased assembly 650, and, optionally, a second non-biased assembly 670 each being supported by an arm 635. The arm 635 supports the respective assembly 640, 650, 670 and provides power thereto to operate the dispenser unit 644, 654, 674 (not shown). Each assembly 640, 650, 670 includes the respective ply roll 642, 652, 672 as described with respect to material dispensing system 200. In some embodiments, each assembly 640, 650, 670 can include a respective tension member 638 mounted and powered by the respective arm 635. In still some illustrative embodiments, each assembly 640, 650, 670 includes a respective take-up roll 639 supported and powered by a second arm 637. The second arm 637 is disposed on the first application head 630 and can move therewith.

In an illustrative embodiment, the material dispensing system 600 includes at least one ply roll 642, 652, 672 comprised of one ply of pre-preg 648 and a backing paper 647 adhered thereto. Since the fibers in the pre-preg ply 648 are impregnated in a polymeric matrix and can have a sticky texture, a backing paper 647 is in contact with the ply of pre-preg 648 while on the ply roll 642. The backing paper 647 needs to be removed from the pre-preg ply 648 prior to placement on the mold 624. Accordingly, a separator member 636 is supported by the respective arm 635 to separate the backing paper 647 from the pre-preg ply 648 as the ply 648 is dispensed onto the mold 624. As the backing paper 647 is separated from the pre-preg ply 648, the backing paper 647 is rotated around the respective tension member 638 and up to the take-up roll 639 and wound therearound.

System 600 includes a second movable head 632 that moves in X, Y, Z motions and independently from the first application head 630. The second movable 632 includes a support arm 633a to support components thereon.

System 600 includes a cutter 680 mounted to the support arm 633a on the second movable head 632. In an embodiment, the cutter 680 is a laser cutter mounted on a track 682 supported by a movable arm 684. The movable arm 684 can be configured to move in X, Y, Z motions for cutting the length and width during or after placement of ply 648.

System 600 also includes a compaction member 633 for pushing the prepreg ply 648 down onto the mold 624. In an embodiment, the compaction member 633 is a compacting roller disposed on the support arm 633a. The step of dispensing can include smoothing a ply or several plies to remove any pockets of air using the compaction member 633. In some exemplary embodiment, the compaction member 633 moves independently from the first application head 230. In some other embodiments, the compaction member 633 may be disposed on or otherwise associated with the first application head 630.

Figure 2:
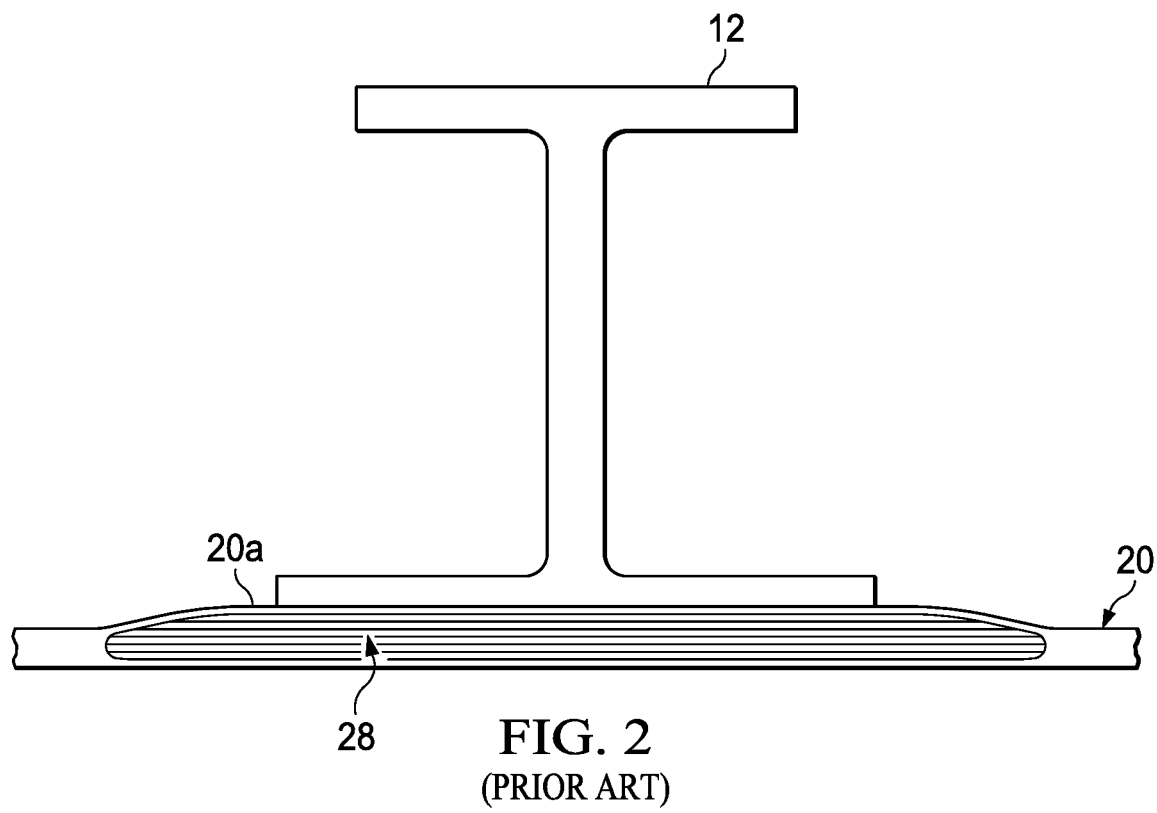
FIG. 2 is a cross-sectional view of a stringer and skin in the prior art tiltrotor wing shown in FIG. 1.

The material dispensing systems and methods described herein can advantageously provide at least one of the following benefits: plies that cover a larger acreage of a near constant cross-section, as opposed to placing a constantly varying amount of material and sizes of material down around highly tailored features as shown in the prior art FIG. 2; a greatly reduced total ply count and part count as compared to the prior art in FIG. 2; the resulting composite article has sufficient stiffness and torsional support for large area aircraft composites (e.g., wing skin 123, spar ribs); low cost composite tooling as compared to the tooling required for the pieces and ply buildups used in the conventional tiltrotor wing shown in FIGS. 1-2; a combination of the methods described herein can reduce overall labor costs by more than 50% as compared to the current labor costs for the conventional tiltrotor wing shown in FIGS. 1-2; allows for point-of-use manufacturing for the composite articles; reduces the number of quality defects as compared to the quality defects in the conventional tiltrotor wing in FIGS. 1 and 2; simple de-tooling; reduces costs; reduces cycle time; and increases material throughput.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 2, and 5 percent.

Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A material dispensing system comprising:
   a pair of tracks mounted to a ceiling or a floor;
   a machine base disposed between the pair of tracks having a longitudinal axis that is parallel to the pair of tracks;
   a mold disposed on the machine base;
   a first frame including movable support members disposed in the pair of tracks, the first frame moves only in an X direction on the pair of tracks during operation; and
   a first application head supported by the movable support members, the first application head comprising a platform disposed on the movable support members, the first application head only moves in an X direction during operation, the first application head comprising:
      a first bias ply assembly comprising a bias ply roll supported on a bias ply dispenser unit, the first bias ply assembly configured to pass bias ply material along a bias path, the first bias assembly supported by the platform, and
      a first non-bias ply assembly comprising a non-bias ply roll supported by a non-bias ply dispenser unit, the non-bias ply assembly configured to pass non-bias ply material along a non-bias path; wherein the bias path and the non-bias path are substantially parallel, the first non-bias assembly supported by the platform and below the first bias ply assembly;
   wherein the first bias ply assembly and the first non-bias ply assembly are in a stacked horizontal configuration such that the longitudinal axis of the first bias ply assembly and the first non-bias ply assembly are perpendicular to the pair of tracks and the longitudinal axis of the machine base during placement of a bias ply material or a non-bias ply onto the mold.

2. The material dispensing system according to claim 1, wherein the first bias ply roll is comprised of a fiber having a bias orientation.

3. The material dispensing system according to claim 2, wherein the bias orientation is at least one of the following: about 15°, about 30°, about 45°, about 60°, about 75°, about 105°, about 120°, about 135°, about 150°, and about 165.

4. The material dispensing system according to claim 1, wherein the non-bias ply roll is comprised of a fiber having a non-bias orientation.

5. The material dispensing system according to claim 4, wherein the non-bias orientation is at least one of the following: about 0°, about 90°, about 180°, and 270°.

6. The material dispensing system according to claim 1, wherein at least one of the bias ply roll and the non-bias ply roll are comprised of a ply having a selected width greater than 24 inches.

7. The material dispensing system according to claim 1, wherein at least one of the bias ply roll and the non-bias ply roll is a ply of resin impregnated fibers.

8. The material dispensing system according to claim 1, further comprising a cutter slidably coupled to the first application head and configured to cut at least along a width of a bias or non-bias ply.

9. The material dispensing system according to claim 1, wherein the system is programmable.

* * * * *